United States Patent
Schöb et al.

(10) Patent No.: US 11,047,721 B2
(45) Date of Patent: Jun. 29, 2021

(54) ULTRASONIC MEASURING DEVICE HAVING TRANSDUCERS HOUSED IN A CLAMPING DEVICE

(71) Applicant: Levitronix GmbH, Zürich (CH)

(72) Inventors: Reto Schöb, Bäch SZ (CH); Natale Barletta, Zürich (CH)

(73) Assignee: LEVITRONIX GMBH, Zürich (CH)

( * ) Notice: Subject to any disclaimer, the term of this patent is extended or adjusted under 35 U.S.C. 154(b) by 0 days.

(21) Appl. No.: 16/176,404

(22) Filed: Oct. 31, 2018

(65) Prior Publication Data
US 2019/0154480 A1 May 23, 2019

(30) Foreign Application Priority Data
Nov. 22, 2017 (EP) ..................................... 17203028

(51) Int. Cl.
*G01F 1/66* (2006.01)
*G01F 15/02* (2006.01)
(Continued)

(52) U.S. Cl.
CPC .............. *G01F 1/662* (2013.01); *G01F 1/667* (2013.01); *G01F 1/668* (2013.01); *G01F 15/02* (2013.01);
(Continued)

(58) Field of Classification Search
None
See application file for complete search history.

(56) References Cited

U.S. PATENT DOCUMENTS 3,738,169 A 6/1973 Courty
3,906,791 A * 9/1975 Lynnworth ............... G01F 1/66
73/861.29
(Continued)

FOREIGN PATENT DOCUMENTS

JP 4991972 B1 8/2012
WO 9517650 A1 6/1995
WO 2016144585 A1 9/2016

OTHER PUBLICATIONS

Extended European Search Report dated Jun. 7, 2018 in corresponding European Patent Application No. 17203028.0, filed Nov. 22, 2017.

*Primary Examiner* — Harshad R Patel
(74) *Attorney, Agent, or Firm* — Global IP Counselors, LLP

(57) ABSTRACT

An ultrasonic measuring device for measuring a fluid flowing in a pipe includes a housing and transducers. The housing receives and fixes the pipe, so that the fluid can flow through a central recess in a flow direction. The ultrasonic transducers emit and receive ultrasonic signals. Two first ultrasonic transducers are arranged laterally on a first side of the central recess, and two second ultrasonic transducers are arranged on a second side of the central recess. The second side is opposed to the first side, so that the recess is located between the first and the second ultrasonic transducers, and the ultrasonic transducers are arranged and aligned so that one of the first ultrasonic transducers emits a first measuring signal to one of the second ultrasonic transducers obliquely to the flow direction and receive a second measuring signal emitted by the second ultrasonic transducer obliquely to the flow direction.

14 Claims, 9 Drawing Sheets

(51) Int. Cl.
   *G01N 9/24* (2006.01)
   *G01N 29/22* (2006.01)
   *G01N 11/04* (2006.01)
   *G01N 29/032* (2006.01)
   *G01N 29/024* (2006.01)

(52) U.S. Cl.
   CPC ............... *G01N 9/24* (2013.01); *G01N 11/04* (2013.01); *G01N 29/222* (2013.01); *G01N 29/024* (2013.01); *G01N 29/032* (2013.01)

(56) References Cited

U.S. PATENT DOCUMENTS

| | | | | |
|---|---|---|---|---|
| 4,454,767 | A * | 6/1984 | Shinkai | G01F 1/662 73/861.18 |
| 4,462,261 | A * | 7/1984 | Keyes | G01F 1/86 73/861.02 |
| 5,179,862 | A * | 1/1993 | Lynnworth | G01F 1/662 73/861.28 |
| 5,546,813 | A * | 8/1996 | Hastings | G01F 1/662 73/861.29 |
| 5,597,962 | A * | 1/1997 | Hastings | G01F 1/662 |
| 6,418,796 | B1 | 7/2002 | Baumoel | G01F 1/66 73/861.27 |
| 6,575,043 | B1 * | 6/2003 | Huang | G01F 1/002 73/861.18 |
| 6,595,071 | B1 * | 7/2003 | Doten | A61B 8/06 73/861.29 |
| 7,194,919 | B2 * | 3/2007 | Shkarlet | A61B 5/6876 600/459 |
| 8,214,168 | B2 * | 7/2012 | Shkarlet | G01F 1/668 702/100 |
| 8,489,342 | B2 * | 7/2013 | Dugger | G01F 1/667 702/48 |
| 8,919,208 | B2 * | 12/2014 | Murakami | G01F 1/667 73/861.27 |
| 2004/0093957 | A1 * | 5/2004 | Buess | G01F 1/662 73/861.27 |
| 2004/0254469 | A1 | 12/2004 | Shkarlet et al. | |
| 2006/0052963 | A1 * | 3/2006 | Shkarlet | G01F 1/668 702/108 |
| 2006/0123922 | A1 * | 6/2006 | Froehlich | G01F 25/0007 73/861.29 |
| 2006/0174717 | A1 * | 8/2006 | Ishikawa | G01F 1/667 73/861.25 |
| 2008/0236297 | A1 * | 10/2008 | Fleet | G01F 1/667 73/861.28 |
| 2010/0095782 | A1 * | 4/2010 | Ferencz | G01F 1/667 73/861.28 |
| 2011/0167907 | A1 * | 7/2011 | Bitto | G01F 15/02 73/32 A |
| 2011/0271769 | A1 | 11/2011 | Kippersund et al. | |
| 2013/0104667 | A1 * | 5/2013 | Koyano | G01F 15/14 73/861.25 |
| 2013/0180341 | A1 * | 7/2013 | Murakami | G01F 1/662 73/861.18 |
| 2013/0305839 | A1 * | 11/2013 | Muench | G01F 1/667 73/861.18 |
| 2015/0082913 | A1 * | 3/2015 | Maruyama | G01F 1/66 73/861.28 |
| 2015/0107370 | A1 * | 4/2015 | Bezdek | G01F 1/66 73/861.27 |
| 2015/0107371 | A1 * | 4/2015 | Khrakovsky | G01F 1/66 73/861.28 |
| 2015/0177036 | A1 * | 6/2015 | Speidel | G01F 1/66 73/861.27 |
| 2015/0198471 | A1 * | 7/2015 | Furlong | G01F 1/667 73/861.27 |
| 2015/0292926 | A1 * | 10/2015 | Takemura | G01F 1/662 73/861.03 |
| 2015/0306789 | A1 * | 10/2015 | Regen | B29B 13/024 428/36.9 |
| 2016/0265954 | A1 * | 9/2016 | Bachmann | G01F 1/667 |
| 2019/0154483 | A1 * | 5/2019 | Hoheisel | G01F 1/662 |
| 2019/0368908 | A1 * | 12/2019 | Aughton | G01F 1/662 |

\* cited by examiner

ULTRASONIC MEASURING DEVICE HAVING TRANSDUCERS HOUSED IN A CLAMPING DEVICE

CROSS-REFERENCE TO RELATED APPLICATION

This application claims priority to European Application No. 17203028.0, filed Nov. 22, 2017, the contents of which are hereby incorporated herein by reference.

FIELD OF THE INVENTION

The invention relates to an ultrasonic measuring device for the measurement on a fluid flowing in a pipe and to a method for the ultrasonic measurement on a fluid flowing in a pipe.

BACKGROUND OF THE INVENTION

Ultrasonic measuring devices for measurement of a fluid flowing in a pipe are used for example to determine the flow of the fluid through a pipe, for example a flexible plastic hose. It is a known measure to design the measuring device as a clamping device in such a way that it can be clamped onto a flexible pipe or that the pipe is clamped by the measuring device. The pipe with the fluid flowing in it is then applied with ultrasonic signals. After passing through the pipe and the fluid, the ultrasonic signals are received by an ultrasonic transducer and the received signal is evaluated.

This non-invasive method of measurement on a flowing fluid is used in particular for such high-purity or very sensitive fluids, in which contact between the fluid and the measuring device is to be avoided, so that the fluid is not contaminated, for example. Examples include the pharmaceutical and biotechnology industries. Here, solutions and suspensions are often produced and conveyed which place very high demands on the purity and/or the integrity of the fluid. In many cases, such fluids even have to be treated under sterile conditions.

Such an ultrasonic measuring device, which is particularly suitable for the non-invasive measurement of high purity substances, is the flow meter designed as a clamping device, which is offered and distributed by the applicant under the trade name LEVIFLOW. This ultrasonic measuring device has two housing parts being connected to each other by an articulated joint. In the open state, the flexible pipe on which the measurement is to be made is inserted into the housing. The two housing parts are then folded together and fixed together, so that the flexible pipe is fixed in the housing by a clamping connection. Two ultrasonic transducers are provided in the housing, each of which can emit and receive an ultrasonic signal. Thereby, a first ultrasonic transducer is arranged on one side of the clamped pipe and a second transducer on the other side of the pipe.

Both ultrasonic transducers are offset with respect to the flow direction of the fluid and aligned in such a way that the first ultrasonic transducer can receive a signal emitted by the second ultrasonic transducer, and the second ultrasonic transducer can receive a signal emitted by the first ultrasonic transducer. Due to the offset to each other, the two ultrasonic transducers are aligned in such a way that they emit their ultrasonic signals obliquely to the flow direction of the fluid, wherein one ultrasonic transducer emits the signal obliquely with the flow direction, while the other ultrasonic transducer emits the signal obliquely against the flow direction. Now a measuring signal is emitted with the first ultrasonic transducer, which is received by the second ultrasonic transducer, and then a measuring signal is emitted by the second ultrasonic transducer, which is emitted by the first ultrasonic transducer.

SUMMARY

The measuring signal emitted obliquely in the flow direction is accelerated in the flow and the measuring signal emitted obliquely against the flow direction is decelerated by the flow. The transit time difference of the two measuring signals is proportional to the flow velocity of the fluid, so that the flow rate through the flexible pipe can be detected from this transit time difference.

This type of ultrasonic measuring devices has proven itself in practice very well. Nevertheless, there is still room for improvement with respect to ever higher requirements, such as measuring accuracy or the flexibility of the measuring device. For example, the influence of the specific pipe used for measurement should be better taken into account. The commonly used pipes, e.g. plastic hoses, are known with regard to their nominal dimensions (e.g. wall thickness, diameter) or with regard to the material, but however, deviations between individual hoses can occur time and again, which can interfere with the ultrasonic measurement or which can limit its accuracy.

It would also be desirable, in particular in process monitoring, if changes in the fluid, for example a change in the concentration of a component of the fluid, could be detected.

The present invention is dedicated to these objects.

Starting from the state of the art, it is therefore an object of the invention to propose an ultrasonic measuring device for the measurement on a fluid flowing in a pipe, which allows a very accurate determination of parameters, which are dependent on the sound propagation in the fluid. Furthermore, it is an object of the invention to propose a corresponding method for the ultrasonic measurement on a fluid flowing in a pipe.

The objects of the invention meeting this problem are characterized by the features of discussed herein.

According to the invention, an ultrasonic measuring device is proposed for the measurement on a fluid flowing in a pipe with a closable housing having a continuous central recess, which has a longitudinal extension defining a flow direction, wherein the housing is designed for a releasable attachment to the pipe in such a way that in the closed state of the housing, the central recess can receive the pipe and fix it with respect to the housing, so that the fluid can flow through the central recess in the flow direction, wherein at least four ultrasonic transducers are further provided in the housing for the respective emitting and receiving of ultrasonic signals, namely at least two first ultrasonic transducers, which are arranged laterally on a first side of the central recess in the closed state of the housing, and at least two second ultrasonic transducers, which are arranged laterally on a second side of the central recess in the closed state of the housing, wherein the second side is opposed to the first side, so that the recess is located between the first and the second ultrasonic transducers, wherein the ultrasonic transducers are arranged and aligned in such a way that in each case a first ultrasonic transducer can emit a first measuring signal to one of the second ultrasonic transducers obliquely to the flow direction and can receive a second measuring signal emitted by said second ultrasonic transducer obliquely to the flow direction, and wherein at least one ultrasonic transducer is provided, which is aligned and arranged in such a way that it can receive a measuring signal progressing perpendicular to the flow direction.

Thus, the ultrasonic measuring device according to the invention comprises at least four ultrasonic transducers, wherein each of the first ultrasonic transducers form a pair with one of the second ultrasonic transducers, which can exchange ultrasonic signals with each other obliquely to the flow direction, i.e. the first and the second ultrasonic transducer of a pair are arranged and aligned in such a way that the second ultrasonic transducer can receive a signal emitted by the first ultrasonic transducer and the first ultrasonic transducer can receive a signal emitted by the second ultrasonic transducer. In doing so, as already explained above, a measuring signal can be received, which was emitted obliquely in the flow direction, and a measuring signal, which was emitted obliquely against the flow direction. The flow velocity of the fluid can then be detected from the transit time difference of these two measuring signals. Since at least two such pairs of ultrasonic transducers are provided according to the invention, the accuracy or reliability of the measurement increases.

In addition, an ultrasonic transducer is provided, which is aligned and arranged in such a way that it can receive a signal progressing perpendicular to the flow direction. This ultrasonic transducer can be either one of the first or the two second ultrasonic transducers, or at least one further ultrasonic transducer may be provided for the measuring signal progressing perpendicular to the flow direction. This measuring signal progressing perpendicular to the flow direction has the advantage that its transit time—at least in very good approximation—is independent of the flow velocity of the fluid in the pipe. Thus, this measuring signal can be used to determine parameters of the fluid, which depend on the speed of sound or the sound absorption in the fluid. As a consequence, the flexibility and possible applications of the measuring device are considerably extended. In addition, changes in the fluid, for example a change in the concentration of a component of the fluid, can be detected from changes in the transit time and/or in the attenuation of the measuring signal progressing perpendicular to the flow direction.

Furthermore, due to the at least four ultrasonic transducers, it is also possible to consider or examine the properties of the pipe and compare them with gauging or calibration data for the pipe. Since the properties of the specific pipe can thus be taken into account in the respective application case, the reliability and accuracy of the measurement increases. To determine a pipe characteristic, i.e. a characteristic describing the properties of the pipe, e.g. the wall thickness, the material of which the pipe is made, or similar, it is possible, for example, that an ultrasonic signal is emitted by one of the first ultrasonic transducers in the direction of the pipe. This signal is referred to below as the characterization signal. The characterization signal is at least partially reflected by the pipe. This can be a multiple reflection within the wall of the pipe, for example. The characterization signal (multiple times) reflected in the wall of the pipe is then detected by the other first ultrasonic transducer, which is arranged on the same first side of the pipe as the first ultrasonic transducer that emitted the characterization signal. A pipe characteristic can then be detected from the transit time of the characterization signal and/or from its attenuation. For example, by comparing the detected pipe characteristic with values detected on new or otherwise characterized pipes, the ultrasonic measuring device can then be calibrated to the pipe used in the respective application. This measure can increase the measurement accuracy of the measurements on the fluid.

The ultrasonic measuring device is designed particularly preferred as a clamping device for a clamping connection with the pipe, with a first housing part comprising the first side, and with a second housing part comprising the second side, wherein the first housing part and the second housing part are connected to each other by an articulated joint. In the open state, the pipe can then be inserted into the central recess, the two housing parts are then simply folded together and locked together, so that in this closed state the ultrasonic measuring device is clamped on the pipe, whereby the pipe is fixed with respect to the housing.

In a preferred embodiment, the four ultrasonic transducers are arranged cross-shaped in the closed state of the housing, so that in each case one of the first ultrasonic transducers on the first side is opposed to one of the second ultrasonic transducers on the second side. In this cross-shaped arrangement, in each case one of the first ultrasonic transducers is in alignment—with respect to a perpendicular to the flow direction—with one of the second ultrasonic transducers, namely with the second transducer with which it does not form a pair. This arrangement offers the advantage that every second ultrasonic transducer can also receive a measuring signal that progresses perpendicular to the flow direction, which is emitted by the respective opposite first ultrasonic transducer, and vice versa.

A preferred measure is that an attenuation element is disposed between the two first ultrasonic transducers and/or between the two second ultrasonic transducers, with which attenuation element a direct exchange of ultrasonic signals is suppressed between the two first ultrasonic transducers and/or between the two second ultrasonic transducers. This is particularly advantageous for the detection of the pipe characteristic described above, in which a signal exchange takes place between the two first or between the two second ultrasonic transducers. The damping element prevents a signal emitted by the one first ultrasonic transducer from reaching the other first ultrasonic transducer directly, i.e. without being reflected. The latter essentially only receives ultrasonic signals that have been reflected at least once by the pipe and especially in the wall of the pipe. The same applies analogously to the second ultrasonic transducers. The attenuation element can includes any material known per se that has a very high or strong attenuation for ultrasonic waves, or can comprise such a material.

Regarding an embodiment, the ultrasonic measuring device includes six ultrasonic transducers, namely the two first ultrasonic transducers, the two second ultrasonic transducers and two calibration transducers for the respective emitting and receiving of ultrasonic signals, wherein in each case one of the calibration transducers is arranged on the first side and on the second side in the closed state of the housing, wherein the two calibration transducers are opposed to each other and wherein the two calibration transducers are each arranged and aligned perpendicular to the flow direction for emitting an ultrasonic signal. In the case of these calibration transducers, the respective emitting and receiving surfaces for the ultrasonic signals are aligned parallel to the flow direction, so that the main direction of propagation of the ultrasonic signals generated by the calibration transducers is perpendicular on the flow direction. These two calibration transducers can therefore be used advantageously both for determining the speed of sound in the fluid independently of the flow velocity of the fluid, and thus for detecting parameters of the fluid which are dependent on the speed of sound or the sound absorption in the fluid, and for determining one or more pipe characteristics which are characteristic of the respective pipe.

Another preferred measure is that the ultrasonic measuring device further comprises a temperature sensor for determining the temperature of the fluid. This measure increases the range of application of the measuring device because it also allows the detection of fluid parameters whose relationship to the speed of sound or sound absorption is dependent on temperature.

The ultrasonic measuring device according to the invention is particularly suitable for flexible pipes, for example plastic hoses. It is therefore a preferred measure that the central recess has a substantially rectangular, preferably square, cross-section perpendicular to the flow direction in the closed state of the housing. In doing so, the flexible pipe, which usually has a round cross-section, is deformed through the housing to an essentially rectangular or square cross-section, which is advantageous for ultrasonic measurement, because the ultrasonic waves then essentially only hit planar, but not curved surfaces, for example.

Furthermore, a method for ultrasonic measurement on a fluid flowing in a pipe is proposed by the invention, comprising the following steps:
a) attaching a housing of an ultrasonic measuring device to the pipe in such a way, that the pipe is received by a continuous central recess, which has a longitudinal extension defining a flow direction and is fixed with respect to the housing;
b) emitting and receiving measuring signals by at least four ultrasonic transducers, namely at least two first ultrasonic transducers which are arranged laterally on a first side of the central recess and at least two second ultrasonic transducers, which are arranged laterally on a second side of the central recess, wherein the second side is opposed to the first side, so that the recess with the pipe is located between the first and the second ultrasonic transducers, wherein
in each case a first ultrasonic transducer emits a first measuring signal to one of the second ultrasonic transducers obliquely to the flow direction or receives a second measuring signal emitted by said second ultrasonic transducer obliquely to the flow direction;
a measuring signal progressing perpendicular to the flow direction is received by at least one ultrasonic transducer;
c) transmitting the received measuring signals to an evaluation unit;
d) detecting at least one parameter, which depends on the speed of sound or the sound absorption in the fluid, by the received measuring signals;

The above explanations regarding the ultrasonic measuring device according to the invention also apply in the same way or in the same sense to the method according to the invention.

Preferably, the parameter is detected by the transit time of a measuring signal, or a transit time difference of two measuring signals, or by attenuation of a measuring signal. Due to the fact that both the attenuation and the transit time of the measuring signals can be taken into account, the range of application of the method is extended.

As already mentioned, it is preferred, with regard to the properties of the respective pipe used, if a characterization signal is emitted by one of the first ultrasonic transducers or by one of the second ultrasonic transducers in the direction of the pipe and the characterization signal reflected by the pipe is received by one of the first ultrasonic transducers or by one of the second ultrasonic transducers, which is arranged on the same side as the ultrasonic transducer which emitted the characterization signal, and wherein a pipe characteristic is detected by means of the received characterization signal.

In procedural terms, it is also a further preferred measure if at least one ultrasonic signal is emitted perpendicularly to the flow direction by two calibration transducers, one of which is arranged on the first side and one on the second side, which ultrasonic signal is received by the same or the other calibration transducer, the received ultrasonic signal being used to detect the pipe characteristic and/or to detect the parameter.

Furthermore, it is preferred that the temperature of the fluid is also detected by a temperature sensor and used to detect at least one parameter.

In procedural terms, it is a further preferred measure that a continuous ultrasonic signal is emitted with at least one ultrasonic transducer, the amplitude of said signal is substantially constant over a predeterminable period of time. With this measure, the ultrasonic signal has a substantially constant amplitude over a longer period of time. Compared to a short ultrasonic pulse, this has the advantage that a higher resolution can be achieved, that the transient components, i.e. in particular the settling and decay processes, practically no longer influence the measurement, and that the simultaneous emitting and receiving of ultrasonic signals is significantly less sensitive to interference effects, such as turbulences in the fluid, temperature fluctuations, etc.

Preferably, the continuous ultrasonic signal is generated by a sequence of discrete pulses, wherein the time interval between two pulses is smaller than the decay time of one pulse.

For example, one or more of the following parameters is/are detected using the method according to the invention: flow rate of the fluid through the pipe, volume or mass fraction of a component of the fluid, concentration of a component contained in the fluid, a solids content in the fluid, optical density of the fluid, cell density in the fluid, viscosity of the fluid, physical density of the fluid, gas concentration in the fluid, change in the composition of the fluid.

As a concrete example may be mentioned here: the alcohol concentration, for example the methanol concentration, in the fluid in volume percent; the sodium hydroxide (NaOH) concentration in the fluid in volume percent; an enzyme or protein concentration in grams per liter in a biological fluid, for example the concentration of bovine serum albumin (BSA) or another globulin in water; the solids content in a suspension (slurry), for example in a suspension of silica (SiO2) in water, or the cell density in a bioreactor, which is usually determined by the optical density, for example the optical density $OD_{600}$ in an E-Coli cell suspension at a wavelength of 600 nm.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
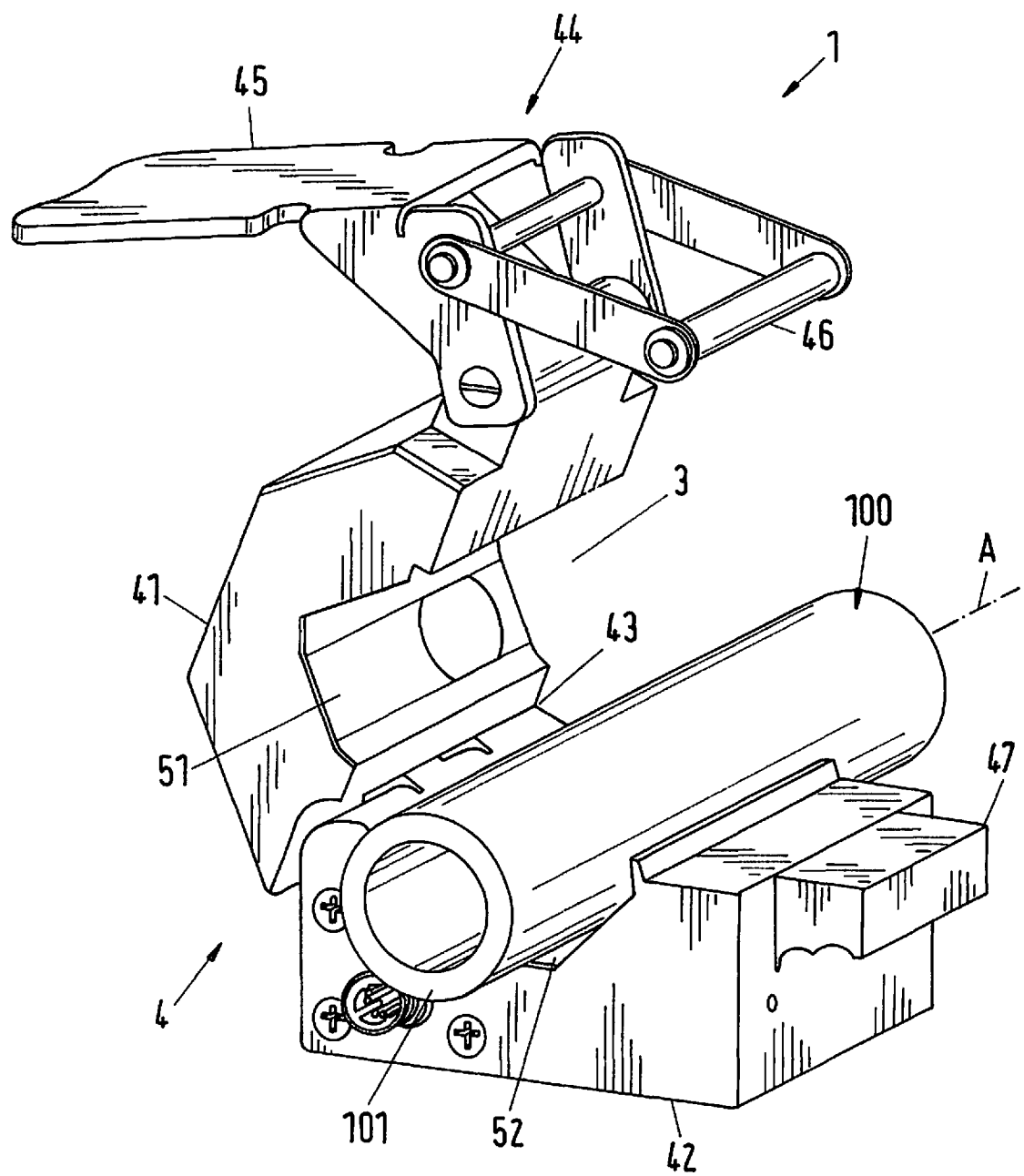
FIG. 1 is an example of an embodiment of the housing of an ultrasonic measuring device according to the invention.

FIG. 1 shows in a perspective illustration an example of an embodiment of a housing of an ultrasonic measuring device according to the invention. This exemplary embodiment can be used for all embodiments and their variants described below. The ultrasonic measuring device is referred to as a whole with the reference sign 1 and the housing of the ultrasonic measuring device 1 is referred to with the reference sign 4.

The ultrasonic measuring device 1 is preferably a clamping device for a clamping connection with a pipe 100, i.e. the housing 4 of the ultrasonic measuring device 1 can be clamped onto a pipe in such a way that the pipe 100 is fixed with respect to the housing 4. The basic design of the housing 4, which is shown in FIG. 1, is known per se, for example from the ultrasonic flow-meters, which are offered and sold by the applicant under the trade name LEVIFLOW.

In the following, reference is made to the case, which is particularly important in practice, where the pipe 100 is a flexible pipe 100, i.e. a pipe 100 whose wall 101 can be deformed. The flexible pipe 100, for example, is a plastic pipe made of silicone rubber or PVC. Of course, the pipe 100 can also be made of other materials, especially a plastic or a rubber.

The housing 4 is designed as a closable housing 4 and comprises a first housing part 41 and a second housing part 42, which are connected to each other by an articulated joint 43. FIG. 1 shows the housing 4 in the open state. The housing 4 further has a continuous central recess 3, which extends through the entire housing 4 and serves to receive the pipe 100. The longitudinal extension of the central recess 3 defines a flow direction A in which a fluid flows through the pipe 100 or the housing 4.

The housing 4 further has a closing mechanism 44 to close the housing 4 and thus to clamp the pipe 100 in the central recess 3. The closing mechanism 44 is arranged here on the first housing part 41 and comprises a bracket 46 and a folding strap 45 for tensioning the bracket 46. The pipe 100 is inserted into the central recess 3, then the two housing parts 41, 42 are folded together, i.e. the first housing part 41 is folded over the pipe 100. The bracket 46 is engaged with a projection 47 on the second housing part 42 and the two housing parts 41, 42 are tensioned together by actuating the strap 45. The housing 4 is then in its closed state, in which the pipe 100 is clamped in the central recess 3 and thus fixed with respect to the housing 4.

In the closed state of housing 1, the pipe is thus fixed between a first side 51 and a second side 52, which are opposed to each other with respect to the central recess 3.

A marking element (not shown) can also be disposed on the housing 4, an arrow for example, which defines the flow direction in which the fluid is to flow through the ultrasonic measuring device 1.

The central recess 3 is preferably designed in such a way that it has a substantially rectangular, in particular a square cross-section perpendicular to the flow direction A in the closed state of the housing 4. This has the advantage that ultrasonic measuring signals, which are applied to the pipe 100, hit planar, i.e. not curved, surfaces, which greatly simplifies the detection and evaluation of the measuring signals and increases the accuracy of the measurement.

Figure 2:
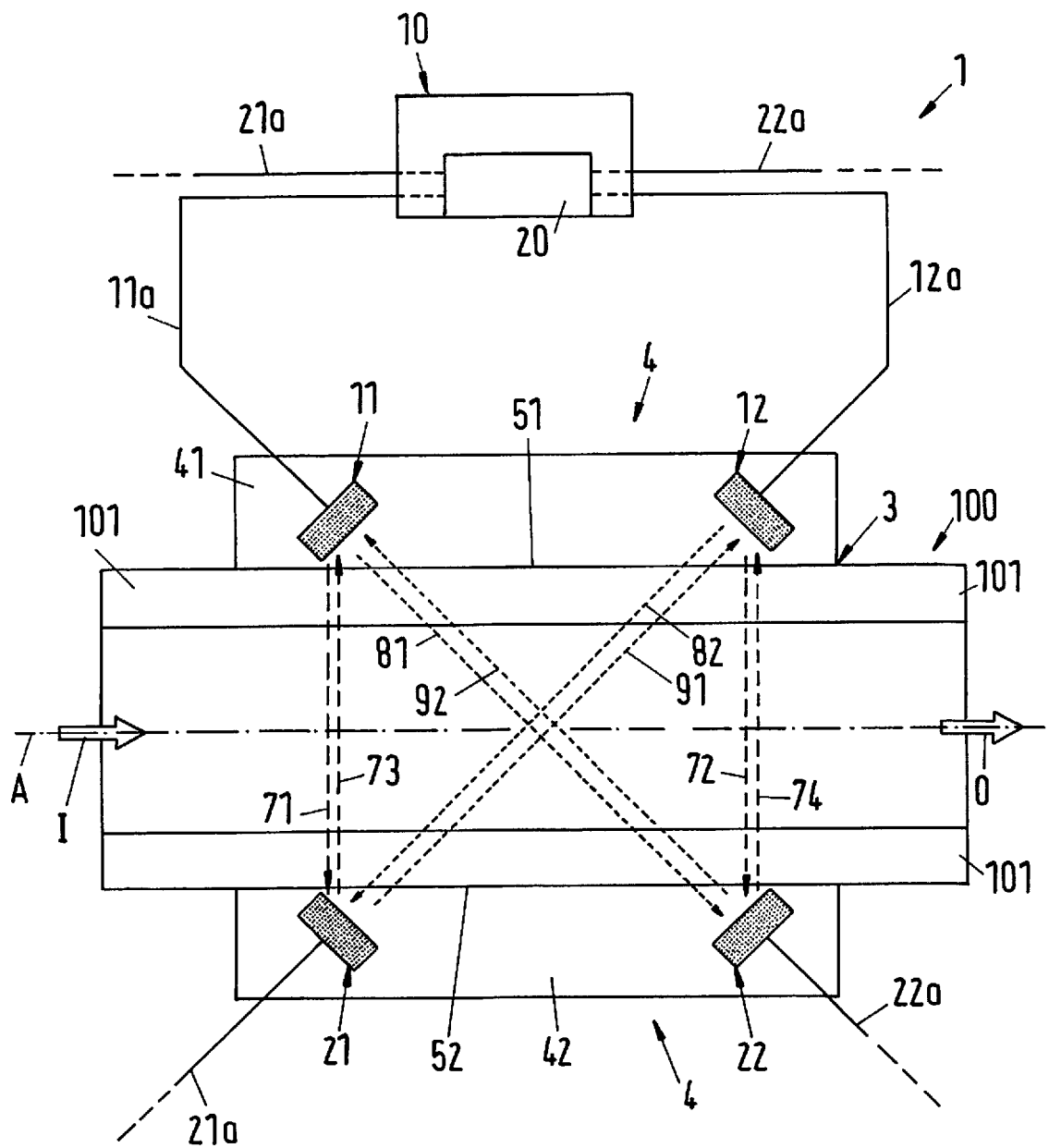
FIG. 2 is a schematic illustration of a first embodiment of an ultrasonic measuring device according to the invention.

FIG. 2 shows in a schematic illustration of a first embodiment of an ultrasonic measuring device 1 according to the invention. The housing 4 of the ultrasonic measuring device 1 can be designed in particular as explained in FIG. 1.

In this first embodiment, a total of four ultrasonic transducers 11, 12, 21, 22 are disposed in the housing 4 for the respective emitting and receiving of ultrasonic signals, namely two first ultrasonic transducers 11, 12, which are arranged laterally on the first side 51 of the central recess 3 in the closed state of the housing 4 and two second ultrasonic transducers 21 and 22, which are arranged laterally on the second side 52 of the central recess 3 in the closed state of the housing 4. Thus, the first ultrasonic transducers 11, 12 are disposed in the first housing part 41 and the second ultrasonic transducers 21, 22 in the second housing part 42, so that the central recess 3 or the pipe 100 inserted into it is arranged between the two first ultrasonic transducers 11, 12 and the two second ultrasonic transducers 21, 22.

Each of the ultrasonic transducers 11, 12, 21, 22 is signal-connected via a signal line 11a, 12a, 21a or 22a to a control device 10. Via the respective signal line 11a, 12a, 21a or 22a, the control device 10 actuates the ultrasonic transducers 11, 12, 21, 22 for emitting ultrasonic signals and receives the signal received by the ultrasonic transducers 11, 12, 21, 22. The measuring signals received by the ultrasonic transducers 11, 12, 21, 22 are transmitted to an evaluation unit 20, which can be integrated in the control unit 10. The received measuring signals are analyzed in the evaluation unit 20 and at least one parameter is detected, which depends on the speed of sound or the sound absorption in the fluid.

The ultrasonic transducers 11, 12, 21, 22 can be designed in any manner known per se, in particular as piezoelectric transducers. The frequency of the ultrasonic signals is typically in the megahertz range, for example in the range from 1 MHz to 30 MHz.

In the closed state of the housing 4, which is also shown in FIG. 2, the four ultrasonic transducers 11, 12, 21, 22 are arranged cross-shaped, wherein the two first ultrasonic transducers 11, 12 are arranged in the upper first housing part 41 on the first side 51 of the central recess, as shown in the illustration (FIG. 2) and the two second ultrasonic transducers 21, 22 in the lower second housing part 42 on the second side 52 of the central recess 3, as shown in the illustration. The two first ultrasonic transducers 11, 12 are arranged in mirror symmetry to the second two ultrasonic transducers 21, 22 with respect to the flow direction A, so that in each case one of the second ultrasonic transducers 21, 22 is opposite to one of the first ultrasonic transducers 11, 12 on the first side 51. Thus, the four ultrasonic transducers 11, 12, 21, 22 are located on the corners of an imaginary rectangle, wherein in each case a first ultrasonic transducer 11 or 12 and a second ultrasonic transducer 21 or 22 are diagonally opposite to each other.

The two diagonally opposite ultrasonic transducers 11, 22 or 12, 21 each form a pair, wherein the ultrasonic transducers 11, 22 or 12, 21, which together form a pair, are arranged and aligned in such a way that their emitting and receiving surfaces, which are typically formed by a piezoelectric crystal, are parallel to each another.

This means the ultrasonic transducers 11, 22 are arranged in such a way that the first ultrasonic transducer 11 can emit a first measuring signal 81 to the second ultrasonic transducers 22 obliquely to the flow direction A and can receive a second measuring signal 92 emitted by the second ultrasonic transducer 22.

The same applies analogously to the pair of ultrasonic transducers 12, 21. The ultrasonic transducers 12, 21 are arranged in such a way that the first ultrasonic transducer 12 can emit a first measuring signal 82 to the second ultrasonic transducers 21 obliquely to the flow direction A and can receive a second measuring signal 91 emitted by the second ultrasonic transducer 21.

The measuring signals 81, 82, 91, 92 are symbolically illustrated in FIG. 2 by dashed straight lines with an arrow tip. This should be understood in such a way that the dashed line indicates the main direction of propagation of the ultrasonic signal emitted by the respective ultrasonic transducer 11, 12, 21, 22 and the arrow tip indicates the direction, i.e. whether the respective ultrasonic signal is moving towards the respective ultrasonic transducer 11, 12, 21, 22, i.e. it is received, or whether it is moving away from it, i.e. it is emitted. The main direction of propagation is usually perpendicular to the surface of the piezoelectric element of the respective ultrasonic transducer 11, 12, 21, 22.

The flow direction A is shown in FIG. 2 in the middle of the pipe 100. In addition, the arrow marked with the reference sign I indicates from which side the fluid flows into the ultrasonic measuring device 1 and the arrow marked with the reference sign O indicates on which side the fluid flows out of the ultrasonic measuring device 1. As shown in FIG. 2, the fluid flows from left to right.

As can be seen in FIG. 2, the first measuring signal 81 and the second measuring signal 91 are emitted obliquely to the flow direction A and in the flow direction A, i.e. that the main propagation direction of the respective measuring signal 81 or 91 has a component different from zero in the flow direction A and a component different from zero perpendicular to the flow direction A.

The first measuring signal 82 and the second measuring signal 92 are each emitted obliquely to the flow direction A and against the flow direction A, i.e. that the main propagation direction of the respective measuring signal 82 or 92 has a component different from zero against the flow direction A and a component different from zero perpendicular to the flow direction A.

Since the ultrasonic transducers 11, 12, 21, 22 are each arranged and aligned obliquely to the flow direction A, for example at an angle of about 45°, each of the ultrasonic transducers 11, 12, 21, 22 can also receive an ultrasonic signal which progresses perpendicular to the flow direction A. Such an ultrasonic signal, which progresses perpendicularly to the flow direction A, hits the respective piezoelectric emitting and receiving surface of the respective ultrasonic transducer 11, 12, 21, 22 obliquely and can thus be received by the transducer and converted into an electrical signal.

Furthermore, the ultrasonic signal emitted in each case by one of the ultrasonic transducers 11, 12, 21, 22 not only propagates in the main direction of propagation, but there are in particular also signal components which progress perpendicularly to the flow direction A. These signal components can be, for example, sub or side maxima (often also referred to as sub or side lobes) of the ultrasonic signal emitted by the respective ultrasonic transducer 11, 12, 21, 22. In the following, these signal components, each of which progresses or runs perpendicular to the flow direction A, are referred to as third measuring signals 71-74, wherein the third measuring signal 71 is emitted by the first ultrasonic transducer 11, the third measuring signal 72 by the first ultrasonic transducer 12, the third measuring signal 73 by the second ultrasonic transducer 21, and the third measuring signal 74 by the second ultrasonic transducer 22.

To determine the flow rate of the fluid through the pipe 100, the procedure is as follows, for example. After the pipe 100 is inserted into the housing 4 and the housing 4 is closed, the fluid flows through the ultrasonic measuring device 1.

The two first ultrasonic transducers 11 and 12 each emit a first measuring signal 81 or 82, wherein the first measuring signal 81 is emitted obliquely and in the flow direction A and the first measuring signal 82 is emitted obliquely and against the flow direction A. The two first measuring signals 81 and 82 are received by the two second ultrasonic transducers 22 or 21 after passing through the fluid and transmitted to the evaluation unit 20 via the respective signal line 22a or 21a.

A second measuring signal 91 or 92 is emitted in each case by the two second ultrasonic transducers 21 and 22, wherein the second measuring signal 91 is emitted obliquely and in the flow direction A and the second measuring signal 92 is emitted obliquely and against the flow direction A. The two second measuring signals 91 and 92 are received by the two first ultrasonic transducers 12 or 11 after passing the fluid and transmitted to the evaluation unit 20 via the respective signal line 12a or 11a.

The evaluation unit 20 thus receives a total of four received measuring signals, of which the first measuring signal 81 and the second measuring signal 91 have passed through the flowing fluid obliquely and in the flow direction A, while the first measuring signal 82 and the second measuring signal 92 have passed through the flowing fluid obliquely and against the flow direction A.

The transit time differences are detected in the evaluation unit 20 between those measuring signals 81 and 91, which were accelerated by the flowing fluid, and those measuring signals 82 and 92, which were decelerated by the flowing fluid. This transit time difference between the measuring signals 81, 91 in the flow direction A and the measuring signals against the flow direction A is directly dependent on the flow velocity of the fluid in the pipe 100. Thus, the flow velocity and thus the flow rate of the fluid through the pipe 100 can be detected from the transit time difference.

A particular advantage is that two independent measurements are carried out both in the flow direction A and against the flow direction A, which significantly increases the accuracy and reliability of the determination of the flow rate.

In addition to the first and second measuring signals 81,82,91,92, the third measuring signals 71-74 are also gathered during the measuring process, i.e. those measuring signals which progress perpendicular to the flow direction A.

This means, for example, that if the first ultrasonic transducer 11 emits the first measuring signal 81 in the direction of the second ultrasonic transducer 22, not only the first measuring signal 81 received by the second ultrasonic transducer 22 is detected, but also the third measuring signal 71 received by the other second ultrasonic transducer 21 is detected. As already mentioned, here the third measuring signal 71 refers to that component of the ultrasonic signal emitted by the first ultrasonic transducer 11 which propagates perpendicular to the flow direction A. If the first ultrasonic transducer 11 emits a signal, which then forms the first measuring signal 81 and the third measuring signal 71, then the measuring signals received by both second ultrasonic transducers 21 and 22 are detected and transmitted to the evaluation unit 20, namely the first measuring signal 81 received by the second ultrasonic transducer 22, which has passed through the fluid obliquely and in the flow direction A, and the third measuring signal 71 which has passed through the flowing fluid perpendicular to the flow direction A.

The same applies analogously to the other ultrasonic transducers 12, 21, 22.

In addition to the first and second measuring signals 81, 82, 91, 92, which have passed through the fluid obliquely and in or against the flow direction A, the evaluation unit 20 additionally receives the four third measuring signals 71, 72, 73, 74, which have passed through the fluid perpendicular to the flow direction A in each case. The evaluation unit 20 can then analyze or evaluate the third measuring signals 71-74 with regard to their transit time through the fluid, their attenuation by the fluid or, of course, also with regard to transit time and attenuation.

Since the four third measuring signals 71-74 pass through the fluid perpendicular to the direction of flow A in each case, their respective transit time through the fluid and their respective attenuations by the fluid are independent of the flow velocity at which the fluid flows through the pipe 100. Therefore, the sound propagation properties in the fluid can be detected using the third measuring signals 71-74, independent of the flow velocity of the fluid in the pipe 100.

Thus, at least one parameter of the fluid can be detected by the third measuring signals 71-74, which parameter depends on the speed of sound or the sound absorption in the fluid. Such parameters, which will be discussed later, are for example the viscosity of the fluid, the occurrence of air bubbles or gas bubbles, the concentration of components in the fluid, for example the methanol concentration, or the solids content in a suspension, or the cell density in a biological fluid.

In particular, these third measuring signals 71-74 passing through the fluid perpendicular to its flow direction A can also be used to detect changes in the fluid, in particular changes in its composition, such as an increase or decrease in the concentration or density of a component. Therefore, the ultrasonic measuring device 1 according to the invention or the method according to the invention is particularly suitable for process monitoring, for example in pharmaceutical or biological processes or for the control of such processes. For example, cell density, protein concentration, salt concentration, nutrient solution concentration, sugar concentration or methanol concentration can be monitored and controlled in one process. If a change in a parameter is detected by means of the ultrasonic measuring device 1, corrective measures can be initiated by an appropriately designed control loop in order to bring the parameter back to its set point.

Another advantage of the ultrasonic measuring device according to the invention or the method according to the invention is, that the properties of the pipe used in the respective application can be taken into account much better, which is explained below with reference to FIG. 3.

Figure 3:
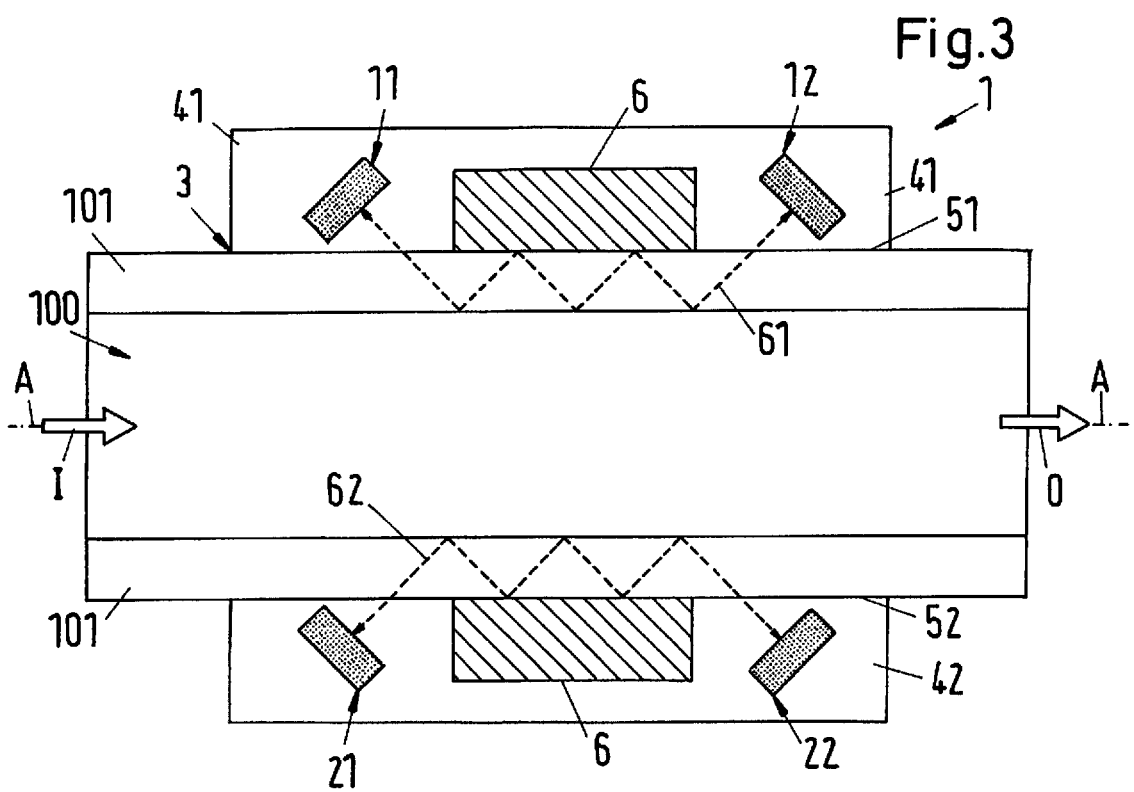
FIG. 3 is similar to FIG. 2 but for a first variant.

FIG. 3 shows a first variant of the first embodiment, which is illustrated in FIG. 2. This first variant differs from the design according to FIG. 2 in that an attenuation element 6 is arranged in each case between the two first ultrasonic transducers 11, 12 and/or between the two second ultrasonic transducers 21, 22, which will be explained later. This attenuation element 6 or these attenuation elements 6 is/are advantageous, but optional, i.e. the following explanations also apply to the embodiment shown in FIG. 2.

For reasons of a better overview, the various measuring signals 81, 82, 91, 92, 71, 72, 73, 74 and the control device 10 with the evaluation unit 20 and the signal lines 11a, 12a, 21a, 22a are not shown again in FIG. 3. It is clear, that the explanations given in FIG. 2 also apply to the first variant shown in FIG. 3.

In order to better consider or examine the properties of the pipe 100 used in the respective application, a pipe characteristic can be detected by means of the two first ultrasonic transducers 11, 12 or by means of the two second ultrasonic transducers 21, 22, which means a characteristic describing the properties of the pipe 100 used in the respective application, for example the thickness of the wall 101 or the material of which the pipe 100 is made. This is explained below using the first two ultrasonic transducers 11, 12 as examples. An ultrasonic signal, in the following referred to as characterization signal 61, is emitted by the first ultrasonic transducer 11 in the direction of pipe 100. This characterization signal 61 or parts thereof, are reflected several times in the wall 101 of the pipe 100, namely at the lower interface of the upper wall 101 shown in FIG. 3 between the wall 101 and the interior of the pipe 100 and at the upper interface between the wall 101 and the first housing part 41 according to the illustration. Since these two interfaces usually represent a transition between two media with different sound impedance, a part of the signal is reflected upon each impact of the characterization signal 61 and another part, the transmission part, penetrates the interface. With the other of the two first ultrasonic transducers, namely with the first ultrasonic transducer 12, the characterization signal 61 emitted by the first ultrasonic transducer 11 is received and fed to the evaluation unit 20.

The transit time of the characterization signal 61 received by the first ultrasonic transducer 12 depends on the thickness of the wall 101 of the pipe 100 and also on the material of the pipe 100. Thus, at least one pipe characteristic can be detected from the received characterization signal 61. In order to increase the accuracy of the detection of the pipe characteristic, it is possible, to emit a characterization signal 61 with each of the two first ultrasonic transducers 11 or 12, which is then received by the respective other first ultrasonic transducer 12 or 11 and is transmitted to the evaluation unit 20. This is shown in FIG. 3 by the double arrow, which represents the characterization signal 61.

Alternatively, but preferably in addition, characterization signals 62 can also be exchanged in the same analogous manner between the two second ultrasonic transducers 21 and 22, which characterization signals are used to detect the pipe characteristic. Furthermore, it is possible, that the attenuation of the characterization signals 61, 62 are also used to detect the pipe characteristic or one pipe characteristic.

The detected pipe characteristic can then be compared with calibration data determined, for example, on new, i.e. unused pipes, or with other known data. In this way it is possible, on the basis of the pipe characteristic, to take into account the properties of the line 100 used in the respective application case when measuring the fluid, which increases the measurement accuracy of the measurements carried out on the fluid.

If the sound impedance of the fluid in the pipe 100 is very close to the sound impedance of the wall 101, the pipe characteristic can also be detected at the empty pipe 100, i.e. if the fluid has not yet passed through the pipe 100 or the pipe 100 is not yet filled with the fluid.

As already mentioned, in the first variant shown in FIG. 3, an attenuation element 6 is provided between the two first ultrasonic transducers 11, 12 and between the two second ultrasonic transducers 21, 22 in each case. The two attenuation elements 6 are arranged in the first housing part 41 or in the second housing part 42. The two attenuation elements 6 consist of or comprise a material, which has at least a very strong ultrasonic attenuation or which even blocks the passage of ultrasonic waves—at least approximately.

The function of the attenuation elements 6 is to suppress a direct exchange of ultrasonic signals—i.e. an exchange without reflection—between the two first ultrasonic transducers 11 and 12 or between the two second ultrasonic transducers 21 and 22. This is particularly advantageous (but not absolutely necessary) with regard to determining the pipe characteristic, because the characterization signal 61 or 62 can then only be exchanged between the two first ultrasonic transducers 11 and 12 or between the two second ultrasonic transducers 21 and 22 via a single or multiple reflection in the wall 101 of the pipe 100.

Of course, it is also possible, to provide an attenuation element 6 only between the two first ultrasonic transducers 11 and 12, or alternatively only between the two second ultrasonic transducers 21 and 22.

Figure 4:
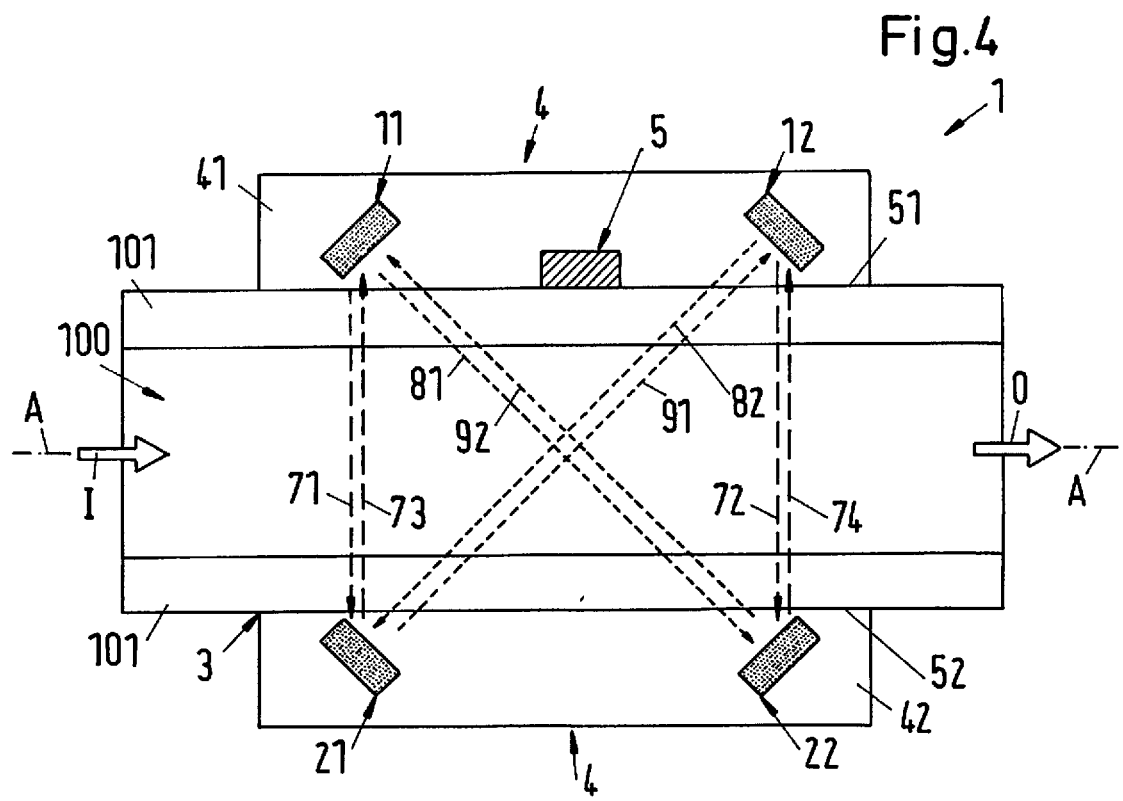
FIG. 4 is similar to FIG. 2 but for a second variant.

FIG. 4 shows a second variant of the first embodiment. For reasons of a better overview, the control device 10 with the evaluation unit 20 and the signal lines 11a, 12a, 21a, 22a are not shown again in FIG. 4. It is clear, that the explanations given in FIG. 2 and FIG. 3 also apply to the second variant shown in FIG. 4. In this second variant, a temperature sensor 5 for determining the temperature of the fluid is further provided in the housing 4 of the ultrasonic measuring device 1. The temperature sensor 5 is arranged in such a way that it is in good thermal contact with the pipe 100 in the closed state of the housing, and preferably in such a way that the temperature sensor 5 is in physical contact with the pipe 100 inserted into the central recess 3. The temperature sensor 5 may be arranged in the first housing part 41 between the two first ultrasonic transducers 11, 12, for example, as shown in FIG. 4. Of course, it is also possible, to arrange the temperature sensor 5 in the second housing part 42. It is also not mandatory to arrange the temperature sensor 5 between two of the ultrasonic transducers 11, 12 or 21, 22. The only important thing is that the temperature sensor 5 is in thermal contact with the fluid when it flows through the pipe 100.

It is possible to detect another parameter of the fluid by the temperature sensor 5, namely one, which is representative of the temperature of the fluid in the pipe 100. This makes it possible to compensate thermal effects, which can influence the ultrasonic measurements. Furthermore, the temperature sensor 5 is particularly advantageous if such a value is detected as parameter, whose dependence on the speed of sound and/or on the sound absorption depends on the temperature. An example of this is explained later with reference to FIG. 9.

Alternatively or in addition, it is also possible to provide the temperature sensor 5 outside the housing 4 of the ultrasonic measuring device 1. The temperature sensor 5 for detecting the temperature of the fluid can particularly also be arranged outside the housing 4, for example as a separate or external temperature sensor 5, which is signal-connected to the evaluation unit 20.

It is clear that the first variant can also be combined with the second variant, i.e. the ultrasonic measuring device 100 can comprise the attenuation element 6 or the attenuation elements 6 as well as at least one temperature sensor 5.

Figure 5:
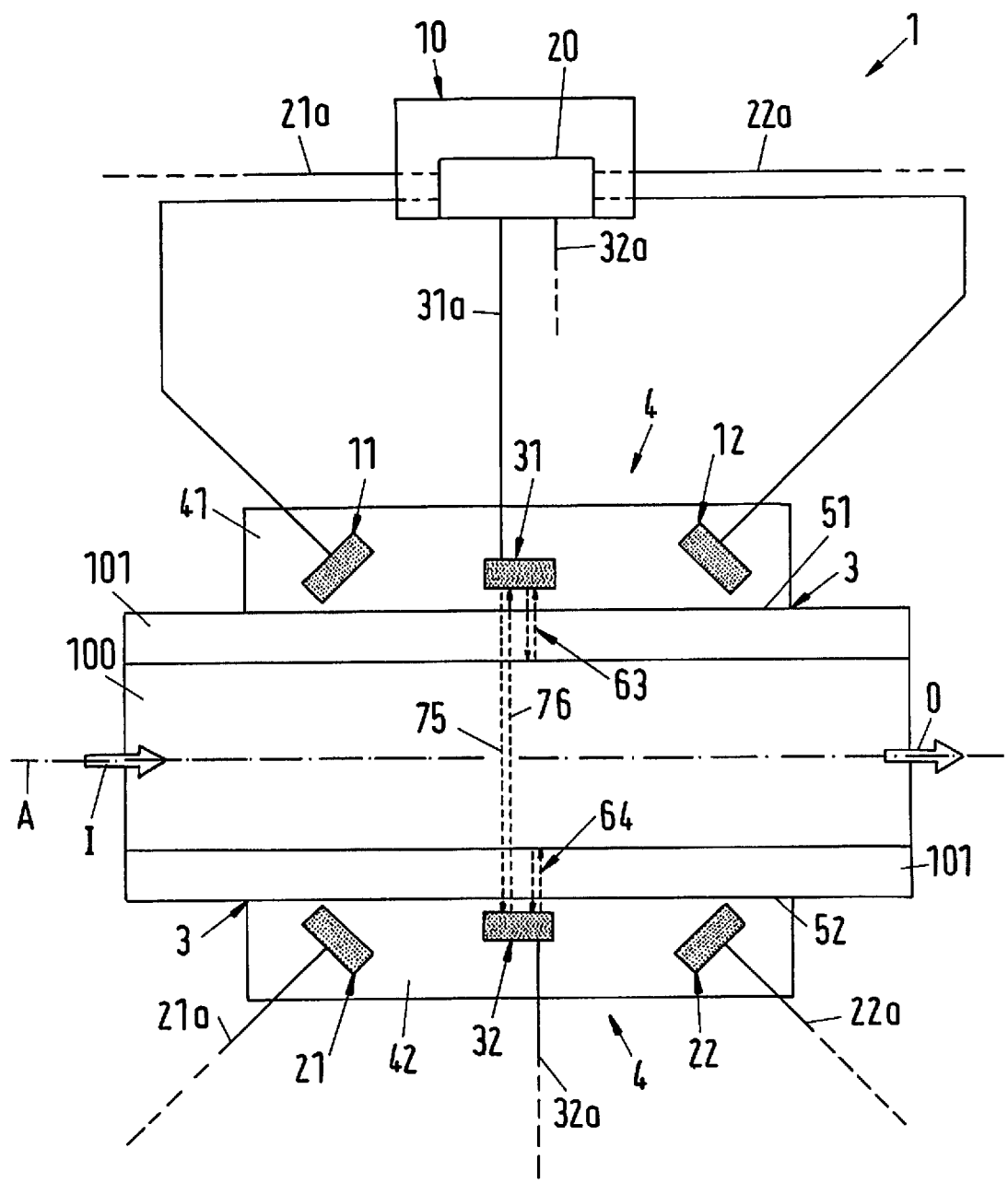
FIG. 5 is a schematic illustration of a second embodiment of an ultrasonic measuring device according to the invention.

FIG. 5 shows in a schematic illustration a second embodiment of an ultrasonic measuring device 1 according to the invention in an illustration analogous to FIG. 2. In the following description of the second embodiment, only the differences to the first embodiment are explained in more detail. Otherwise, the explanations of the first embodiment or its variants also apply to the second embodiment in the same way or in the analogously same manner. In the second embodiment, the same parts or parts with the same function are referred to with the same reference signs as in the first embodiment or its variants. It is clear that the first and second variants shown in FIG. 3 and FIG. 4 can also be combined with the second embodiment.

For reasons of a better overview, the first measuring signals 81, 82 and the second measuring signals 91, 92 are not shown again in FIG. 5.

In the second embodiment, the ultrasonic measuring device 1 comprises a total of six ultrasonic transducers, namely the two first ultrasonic transducers 11, 12, the two second ultrasonic transducers 21, 22 and two calibration transducers 31, 32 for the respective emitting and receiving of ultrasonic signals.

The calibration transducers 31, 32 can be designed in the same way as the other ultrasonic transducers 11, 21, 21, 23. The term "calibration transducer" is used to distinguish between the first and the second ultrasonic transducers 11, 12 or 21, 22.

One of the two calibration transducers 31, 32 is disposed in each of the two housing parts 41, 42. In the closed state of the housing 4, the calibration transducer 31 is arranged on the first side 51 of the central recess 3 and the second calibration transducer 32 is arranged on the second side 52 of the central recess 3. Here, the two calibration transducers 31, 32 are arranged in such a way that they are opposed to each other and are arranged in mirror symmetry with respect to the flow direction A. Each of the two calibration transducers 31, 32 is arranged perpendicular to the flow direction A for the respective emitting of an ultrasonic signal. Both calibration transducers 31, 32 are preferably arranged in such a way that their respective emitting and receiving surface is parallel to the flow direction A, and thus the main propagation direction of the ultrasonic signals emitted by the calibration transducers 31, 32 is in each case perpendicular to the flow direction A.

In the embodiment shown in FIG. 5, the calibration transducer 31 is arranged between the two first ultrasonic transducers 11 and 12, preferably in the middle, and the calibration transducer 32 is arranged between the two second ultrasonic transducers 21 and 22, preferably in the middle. This arrangement is preferred but not mandatory. It is also possible, for example, to arrange the two calibration transducers 31, 32 on the right of the ultrasonic transducers 12 and 22 or on the left of the ultrasonic transducers 11 and 21 according to the illustration (FIG. 5), i.e. outside the space between the two first ultrasonic transducers 11, 12 or between the two second ultrasonic transducers 21, 22.

Each of the two calibration transducers 31, 32 is signal-connected to the evaluation unit 20 or to the control device 10 via a respective signal line 31a or 32a.

The two calibration transducers 31, 32 are used to emit and to receive an ultrasonic signal perpendicular to the flow direction A. Thus, the two calibration transducers are used to detect a parameter of the fluid independent of the flow velocity of the fluid in the pipe 100. In addition, it is possible to determine a pipe characteristic by means of the calibration transducers 31, 32.

With regard to the determination of the parameter, the two calibration transducers are used to emit and to receive third measuring signals 75, 76 progressing perpendicular to the flow direction A. That is to say, the third measuring signals 71, 72, 73, 74, which are generated by the first ultrasonic transducers 11, 12 and the second ultrasonic transducers 21, 22 in the first embodiment, are generated by the separate calibration transducers 31, 32 in the second embodiment. The calibration transducer 31 emits the third measuring signal 75, which is received by the calibration transducer 32 after passing through the fluid, and the calibration transducer 32 emits the third measuring signal 76, which is received by the calibration transducer 31 after passing through the fluid. With these two third measuring signals 75, 76, a fluid parameter independent of the flow velocity of the fluid can then be detected in an analogous manner, as explained above with reference to the third measuring signals 71, 72, 73, 74.

The third measuring signals 76, 75 received by the calibration transducers 31, 32 can also be analyzed with regard to their transit time, or with regard to their attenuation, or with regard to their transit time and their attenuation.

Furthermore, a pipe characteristic can also be detected by the calibration sensors 31, 32. For this purpose, the calibration transducer 31 emits a characterization signal 63 perpendicular to the flow direction A. This characterization signal 63 is then reflected—partially—by the pipe 100 at the interface between the wall 101 and the interior of the pipe 100 and the resulting echo signal is received by the same calibration transducer 31, which also emitted the characterization signal 63.

Alternatively or in addition, the other calibration transducer 32 can also be used for detecting the pipe characteristic. For this purpose, the calibration transducer 32 emits a characterization signal 64 perpendicular to the flow direction A. This characterization signal 64 is then reflected—partially—by the pipe 100 at the interface between the wall 101 and the interior of the pipe 100 and the resulting echo signal is received by the same calibration transducer 32, which also emitted the characterization signal 64.

In the analogously same manner as described with reference to the first embodiment, the received characterization signals 63 and/or 64 are transmitted to the evaluation unit 20 in order to determine the pipe characteristic.

Departing from the illustration in FIG. 5, it is also possible to provide only one of the two calibration sensors 31, 32, i.e. either the first calibration sensor 31 or the second calibration sensor 32. In such an embodiment, the ultrasonic measuring device then has five ultrasonic sensors, namely the two first ultrasonic transducers 11, 12, the two second ultrasonic transducers 21, 22 and only one of the calibration transducers, either 31 or 32.

With regard to a particularly high accuracy and reliability of the measurement, it is a preferred measure—both for the first embodiment and for the second embodiment, if a continuous ultrasonic signal is emitted with at least one ultrasonic transducer 11, 12, 21, 22, 31, 32. In a preferred embodiment, either the two first ultrasonic transducers 11, 12 are activated to emit a continuous ultrasonic signal in each case to determine the flow rate of the fluid through pipe 100, namely a first measuring signal 81 (see FIG. 2) obliquely and in the flow direction A and a first measuring signal 82 obliquely and against the flow direction, wherein these first measuring signals 81, 82 are received by the second ultrasonic transducers 22 and 21, or the two second ultrasonic transducers 22 are activated to emit a continuous ultrasonic signal in each case, namely a second measuring signal 91 (see FIG. 2) obliquely and in the flow direction A and a second measuring signal 92 obliquely and against the flow direction, wherein these second measuring signals 91, 92 are received by the first ultrasonic transducers 12 and 11.

Of course, it is also possible, for example, in order to detect a parameter, which is independent of the flow velocity of the fluid, to emit a continuous ultrasonic signal as the third measuring signal 75 or 76 perpendicular to the flow direction A by means of one of the two calibration transducers 31 or 32 and to receive this third measuring signal 75 or 76 with the other calibration transducer 32 or 31.

The term "continuous" ultrasonic signal refers to such an ultrasonic signal in which the amplitude of the signal is essentially constant over a period of time, which is significantly greater than the settling time or the decay time of the signal, i.e. a transient part of the signal. The amplitude of the signal is called "substantially" constant over a period of time, if the change in the amplitude of the signal during this period is at most 7%, in particular at most 5%, preferred at most 3% and particularly preferred at most 1%. This is explained in more detail below with reference to FIG. 6.

Figure 6:
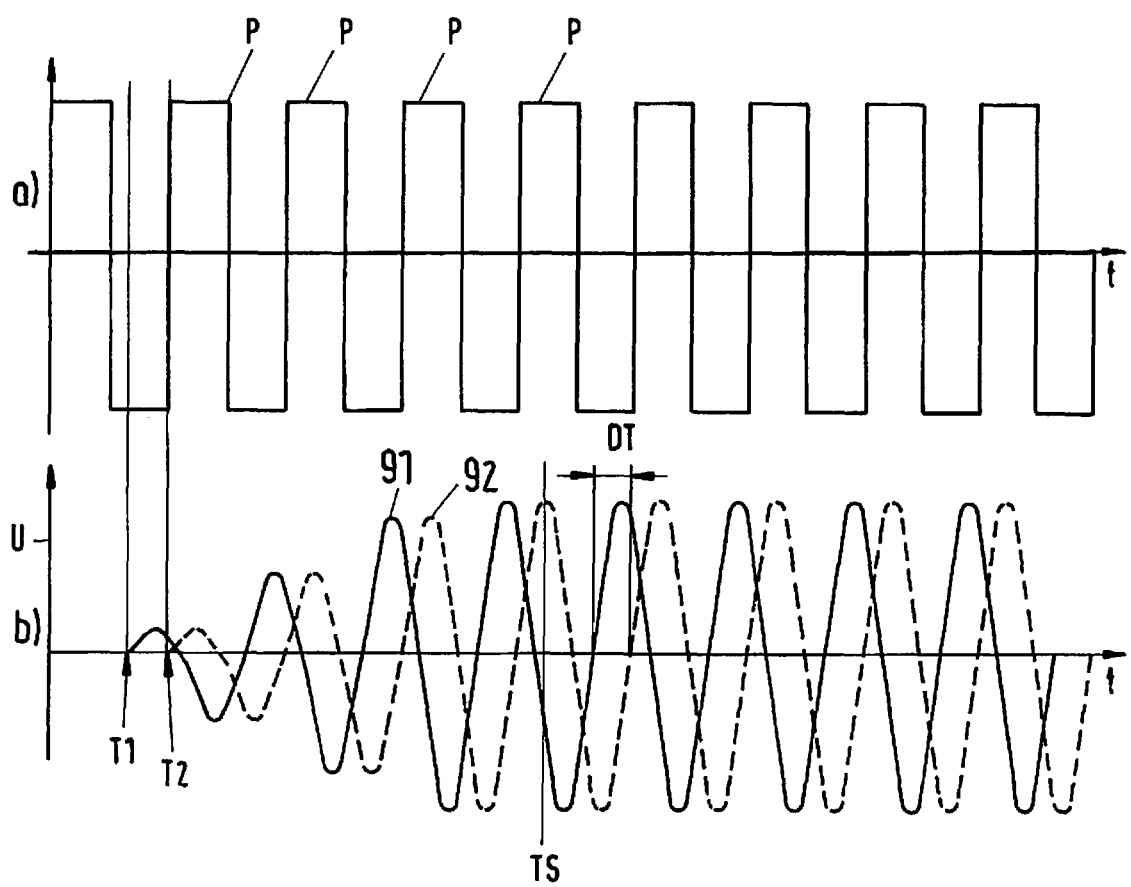
FIG. 6 is an illustration of a pulse sequence for generating a continuous ultrasonic signal and the illustration of received ultrasonic signals.

FIG. 6 shows in the illustration b) the time course of two continuous ultrasonic signals, wherein the amplitude U of the respective ultrasonic signal is plotted on the abscissa, and the time t is plotted on the ordinate. Both signals shown are in each case a signal received by one of the first or second ultrasonic sensors 11, 12, 21, 22. Without loss of generality, for example, the signal displayed with a solid line is the second measuring signal 91 received by the first ultrasonic transducer 12, which was emitted by the second ultrasonic transducer 21, and the signal displayed with a dashed line is the second measuring signal 92 received by the first ultrasonic transducer 11, which was emitted by the second ultrasonic transducer 22.

As can be clearly seen, both measuring signals 91, 92 have a transient part, which extends in each case up to about the time TS. This is the settling time of the respective measuring signal 91, 92, in which the amplitude of the measuring signal 91, 92 increases significantly. From the time TS, the amplitude of the two measuring signals 91, 92 is at least essentially constant in time. The decay time of the respective measuring signal 91, 92, which is located on the time axis t to the right of the displayed range is not shown in the illustration b) of FIG. 6. In the decay time (i.e. after completion of the emitted measuring signal) the amplitude of the respective measuring signal decreases with time t and then reaches the value zero.

Within the framework of this application, an ultrasonic signal is called "continuous" if the amplitude of the signal is essentially constant over a period of time, which is significantly larger, in particular at least twice as large, preferably at least ten times as large, as the period in which the signal is transient, i.e., for example, the settling time or the decay time of the signal. According to the illustration b) in FIG. 6, this means that the time period to the left of the time TS is significantly smaller than the time period to the right of the time TS, in which the amplitude of the respective measuring signal 91 or 92 is constant in time. Of course, it is clear that a continuous ultrasonic signal is also a time-limited signal.

In order to emit a continuous ultrasonic signal, for example with the two second ultrasonic transducers 21 and 22, it is possible to activate the respective ultrasonic transducer 21 or 22 with a continuous electrical signal of suitable frequency, wherein the length of the activating signal is selected in such a way that it corresponds to the desired length of the ultrasonic signal.

Another possibility to generate a continuous ultrasonic signal is to generate a sequence of discrete pulses, wherein the time interval between two pulses is smaller than the decay time of one pulse. This is depicted in the illustration a) of FIG. 6.

As already mentioned, FIG. 6 refers to the embodiment that the two second ultrasonic transducers 21, 22 are used to emit the second measuring signals 91, 92, while the two first ultrasonic transducers 12 and 11 are used to receive the second measuring signals 91, 92. The illustration a) in FIG. 6 depicts such a sequence of individual or discrete pulses P, which is emitted simultaneously by the emitting second ultrasonic transducers 21, 22. Before a discrete pulse P has decayed as an ultrasonic signal, the next discrete pulse P follows. A continuous ultrasonic signal, here as second measuring signal 91, 92, can be generated by such a sequence of discrete pulses P.

In the following, it will be explained with reference to FIG. 6, how the flow velocity of the fluid in the pipe 100 and thus the flow rate of the fluid through the pipe 100 can be detected by the first and the second ultrasonic transducer 11, 12 or 21, 22.

As already mentioned, the two second ultrasonic transducers 21 and 22 are used as emitting ultrasonic transducers 21, 22 in the embodiment illustrated in FIG. 6, wherein the second ultrasonic transducer 21 emits the second measuring signal 91 obliquely to the flow direction A and in the flow direction A, while the second ultrasonic transducer 22 emits the second measuring signal 92 obliquely to the flow direction A and against the flow direction A. The second measuring signal 91 is received by the first ultrasonic transducer 12 and the second measuring signal 92 by the first ultrasonic transducer 11.

The illustration a) in FIG. 6 shows the pulses P, with which the continuous ultrasonic signal is generated, which is emitted simultaneously as second measuring signal 91 or 92 by the second ultrasonic transducer 21 and by the second ultrasonic transducer 22.

The illustration b) in FIG. 6 shows on the same time axis t as illustration a) the second measuring signal 91 (solid line) received by the first ultrasonic transducer 12 and the second measuring signal 92 (dashed line) received by the first ultrasonic transducer 11.

The second measuring signal 91, which runs with the flow direction A, reaches the first ultrasonic transducer 12 at time T1, and the second measuring signal 92, which runs against the flow direction A, reaches the first ultrasonic transducer 11 at later time T2. The transit time difference T2-T1 depends on the flow velocity of the fluid in the pipe 100 and can be particularly proportional to the flow velocity. Preferably, the part of the second measuring signals 91, 92 is now evaluated which is temporally right of the time TS, i.e. in the range in which the second measuring signals 91, 92 have a constant amplitude. The flow velocity of the fluid and thus the flow rate of the fluid through the pipe 100 can be detected particularly precisely from the stable transit time difference DT in this range between the two second measuring signals 91, 92.

The use of continuous ultrasonic signals as measuring signals 91, 92 has, in particular, the advantage that the evaluation of transient signal parts can be avoided. In addition, the simultaneous emitting and receiving of the measuring signals 91, 92 is significantly less sensitive to disturbances, such as turbulences in the fluid or temperature fluctuations. The evaluation in the range of the measuring signals 91, 92, where their amplitude is at least substantially constant, also enables a higher accuracy of the measurement, since two sinusoidal signals of constant phase relationship are evaluated here.

The number of discrete pulses P, which is used for generating the continuous ultrasonic signal, depends on the application and is defined in such a way that the emitted or received ultrasonic signal has a predeterminable range of constant amplitude or a range of a stable signal phase. For many applications a number of at least twenty discrete pulses P is advantageous to generate an ultrasonic signal with constant amplitude over a sufficient period of time.

In the following some examples of fluid parameters are explained with reference to FIG. 7-13, which can be detected by means of the ultrasonic measuring device 1 according to the invention or by means of the method according to the invention. These can also be fluids in particular, which are used in pharmaceutical or biotechnological processes, for example cell suspensions, protein-containing fluids or fluids with organic components. They can also be fluids that are commonly used in the semiconductor industry, such as slurry suspensions of silicon dioxide in water or the like.

It has already been explained above how the flow rate of the fluid can be detected as a parameter. In the following, such parameters of the fluid are referred to as examples, which are independent of the flow velocity of the fluid in the pipe 100. These are parameters of the fluid, which are dependent on the speed of sound or the sound absorption in the fluid. FIGS. 7-11 show diagrams, which each refer to the detection of the speed of sound in the fluid by means of a transit time measurement of a third measuring signal, while FIGS. 12 and 13 refer to the measurement of the attenuation of an ultrasonic signal.

In order to detect such fluid parameters, which do not depend on the flow velocity in the pipe 100, one or more of the third measuring signals 71, 72, 73, 74, 75, 76 are preferably used or evaluated, i.e. such measuring signals, which progress perpendicular to the flow direction A. Here, it is both possible to use and to evaluate one or more of the third measuring signals 71, 72, 73, 74, which are generated by the first or the second ultrasonic transducers 11, 12, 21, 22 and also such third measuring signals 75, 76, which are generated by the calibration transducers 31 or 32 or, if only one calibration transducers 31 or 32 is provided, generated by this calibration transducer 31 or 32. Alternatively, it is also possible to evaluate the sum of the transit times between the ultrasonic transducers 11 and 22 or between the ultrasonic transducers 12 and 21 instead of the difference. If in each case a signal is emitted in the flow direction and one against the flow direction, the flow speed-dependent components of the two transit times cancel each other out. The sum of the two transit times is then essentially dependent on the speed of sound in the liquid or in the hose material.

Figure 7:
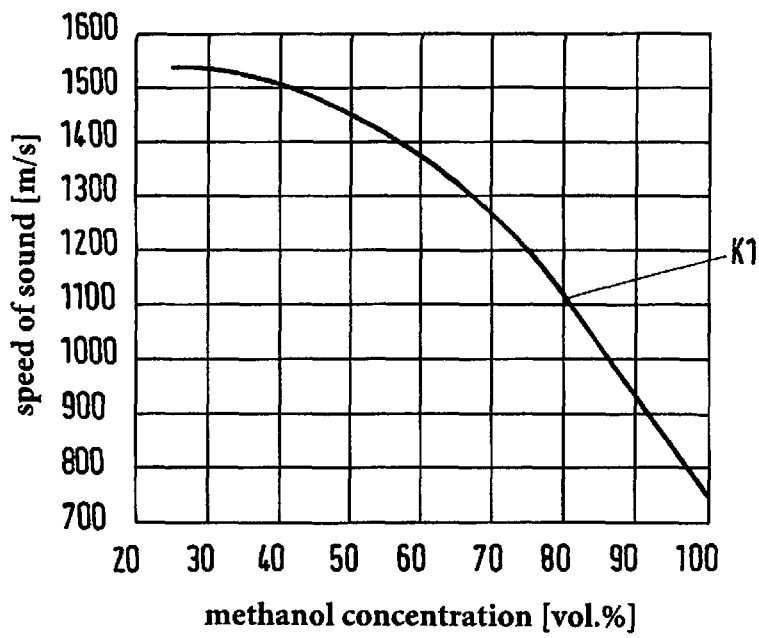
FIG. 7-11 are diagrams each showing the relationship between a parameter of the fluid and the speed of sound.

In the diagram in FIG. 7, the parameter is the methanol concentration in the fluid, for example in water. The methanol concentration is given in percent by volume. FIG. 7 shows with curve K1 the relationship between the speed of sound in the fluid in meters per second (m/s) and the methanol concentration in the fluid for a concentration range from about 20 vol % (volume percent) to 100 vol %. In this concentration range, the relationship is unambiguous, i.e. the methanol concentration in the fluid can be unambiguously detected as a parameter from the detection of the speed of sound.

Figure 8:
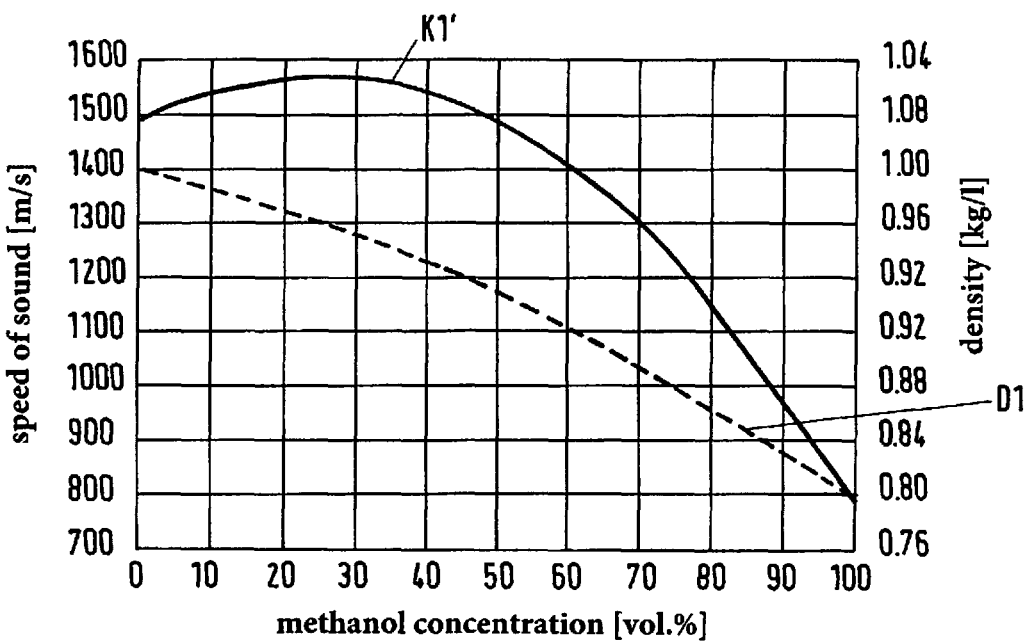

FIG. 8 is similar to FIG. 7, but here the relationship between the methanol concentration in the fluid and the speed of sound in the fluid is shown by curve K1' for the entire concentration range from 0 vol % to 100 vol %. Since this curve K1' has a maximum, some speed of sounds, namely those below a concentration of about 50 vol %, can no longer be unambiguously assigned a value of the methanol concentration, because here two different values of concentration belong to each speed of sound. If now another parameter of the fluid is known, or is detected by measurement, the methanol concentration in the fluid can nevertheless be unambiguously derived from the determined speed of sound. For example, if the density of the fluid is also detected by measurement or if this is known, the methanol concentration in the fluid can be unambiguously determined from the dependence of the density on the methanol concentration, which is shown in FIG. 8 by curve D1 and the detected value of the speed of sound. In the right-hand abscissa according to the illustration, the density in kilograms per liter (kg/l) is shown in FIG. 8.

Figure 9:
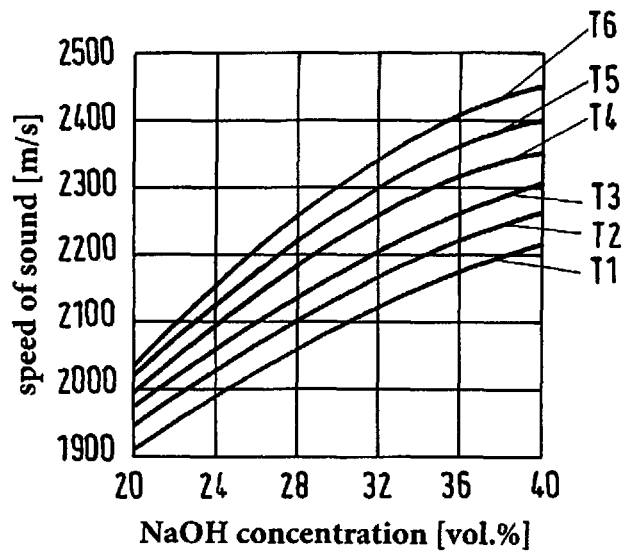

In the diagram in FIG. 9, the parameter is the sodium hydroxide (NaOH) concentration in the fluid, for example in water. The NaOH concentration is given in percent by volume. The relationship between the NaOH concentration in the fluid and the speed of sound in the fluid is also dependent on the temperature of the fluid. FIG. 9 shows a number of curves with the curves T1-T6, which in each case indicate the relationship between the speed of sound in the fluid and the NaOH concentration in the fluid for a concentration range from about 20 vol % to about 40 vol % at a given temperature. Curve T1 shows the relationship for 0° C., curve T2 the relationship for 20° C., curve T3 the relationship for 40° C., curve T4 the relationship for 60° C., curve T5 the relationship for 80° C. and curve T6 the relationship for 100° C. If the temperature of the fluid is known, the relationship between the NaOH concentration and the speed of sound is unambiguous, i.e. the NaOH concentration in the fluid for this temperature can be unambiguously detected as a parameter from the detection of the speed of sound at a known temperature. The temperature of the fluid can be determined with the temperature sensor 5 (see FIG. 4), for example.

Figure 10:
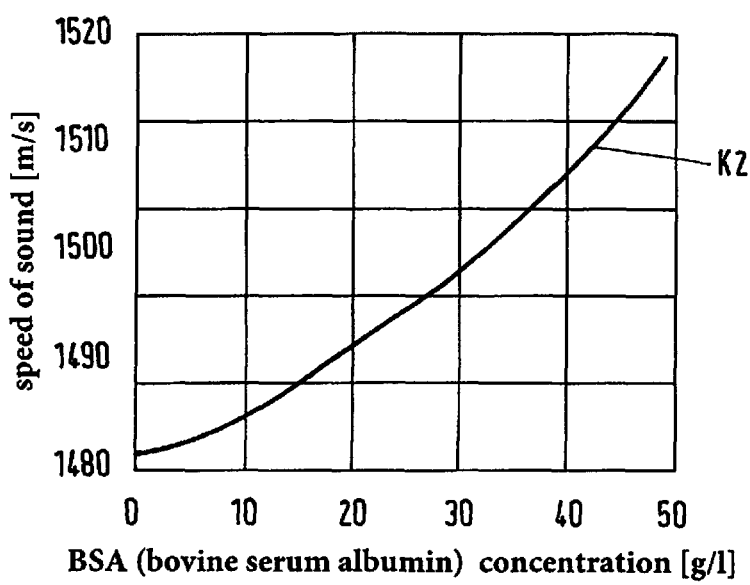

In the diagram in FIG. 10, the parameter is the bovine serum albumin (BSA) concentration in the fluid water. The BSA concentration is given in grams per liter (g/L). FIG. 10 shows with curve K2 the relationship between the speed of sound in the fluid consisting of water and BSA and the BSA concentration in the fluid for a concentration range from 0 g/L to about 50 g/L. Curve K2 indicates the relationship for a temperature of the fluid of 20° C. as an example. This relationship is unambiguous, i.e. the BSA concentration in the fluid can be unambiguously detected as a parameter from the detection of the speed of sound.

Figure 11:
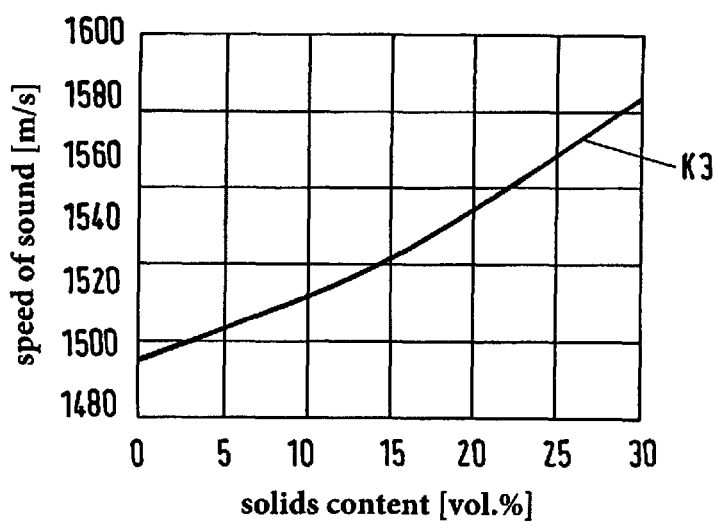

FIG. 11 refers to an example from semiconductor production. In the diagram in FIG. 11, the parameter is the solids content in a suspension of silicon dioxide $SiO_2$, which is usually referred to as slurry. The solids content, i.e. the $SiO_2$ concentration is given in percent by volume. FIG. 11 shows with curve K3 the relationship between the speed of sound in the slurry and the solids content of $SiO_2$ in the slurry for a range from 0 vol % to 30 vol %. More precisely, curve K3 indicates the relationship between the speed of sound and the solids content in a $SiO_2$ slurry with particles of 30 micrometers in size at a fluid temperature of 20° C. and at an ultrasonic frequency of 3 MHz. As shown in curve K3, the relationship between the speed of sound and the solids content is unambiguous, i.e. the solids content in the slurry can unambiguously be detected as a parameter from the detection of the speed of sound.

Figure 12:
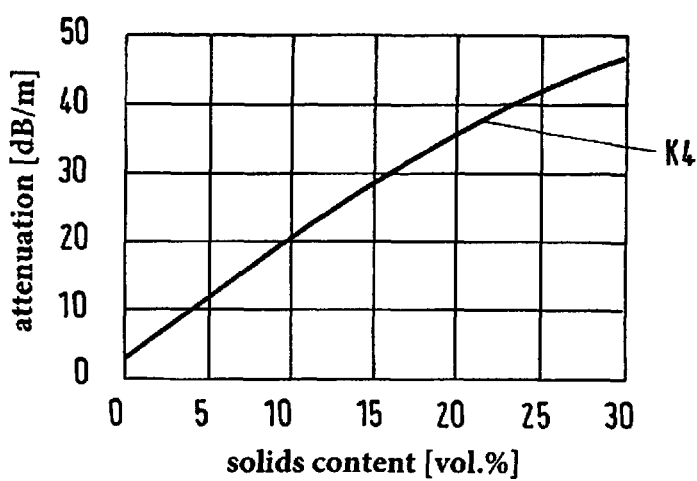
FIG. 12-13 are diagrams each showing the relationship between a parameter of the fluid and the sound absorption.
Figure 13:
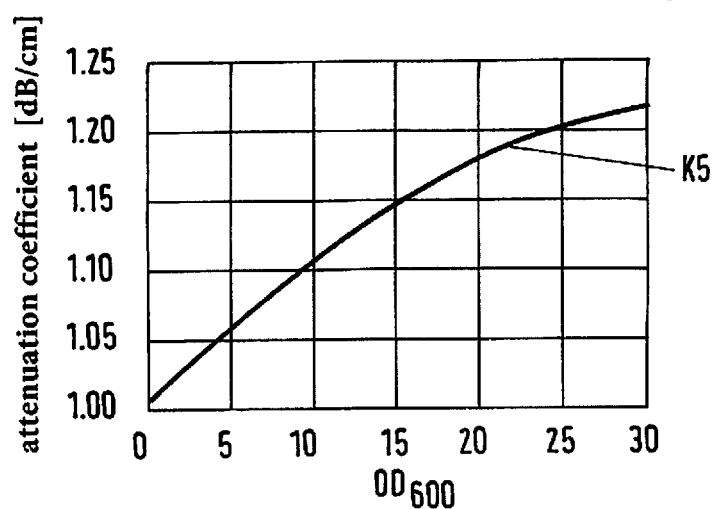

FIGS. 12 and 13 show two examples in which the attenuation of the ultrasonic signal, e.g. of a third measuring signal 71-76, is determined in order to detect a characteristic of the fluid.

In the diagram in FIG. 12, the parameter is again the solids content in a suspension of silicon dioxide $SiO_2$, i.e. in a slurry. The solids content, i.e. the $SiO_2$ content, is given in percent by volume. FIG. 12 shows with curve K4 the relationship between the attenuation of an ultrasonic signal, measured in decibels per meter (dB/m), in the slurry and the solids content of $SiO_2$ in the slurry for a range from 0 vol % to 30 vol %. More precisely, curve K4 indicates the relationship between the acoustic attenuation and the solids content in a $SiO_2$ slurry with particles of 30 micrometers in size at a fluid temperature of 20° C. and at an ultrasonic frequency of 3 MHz. As shown in curve K4, the relationship between the attenuation and the solids content is unambiguous, i.e. the solids content in the slurry can unambiguously be detected as a parameter of the fluid from the detection of the attenuation of the ultrasonic signal.

In the diagram in FIG. 13, the parameter detected from the attenuation of the ultrasonic measuring signal is the optical density of a cell suspension. That is to say, the fluid is a cell suspension, for example an E-*Coli cell suspension. It is often common, for example in biotechnology or the pharmaceutical industry, to characterize the cell content or cell concentration in a biological fluid by the $OD_{600}$*—value, because it is easy to measure and correlates well with cell density. The $OD_{600}$—value indicates the optical density of the suspension, for example the cell suspension, at a light wavelength of 600 nm. FIG. 13 shows with curve K5 the relationship between the attenuation of an ultrasonic signal, measured in decibels per centimeter (dB/cm), in a cell suspension and the optical density $OD_{600}$ of the cell suspension. More precisely, curve K5 indicates the relationship between the attenuation coefficient in dB/cm and the optical density $OD_{600}$ for an E-*Coli cell suspension at a temperature of the fluid of* 37° C. and at an ultrasonic frequency of 10 MHz. With reference to curve K5, the $OD_{600}$—value of the cell suspension and thus indirectly the cell density can unambiguously be detected as a parameter of the fluid from the measurement of the attenuation of the ultrasonic signal in the fluid.

Figure 14:
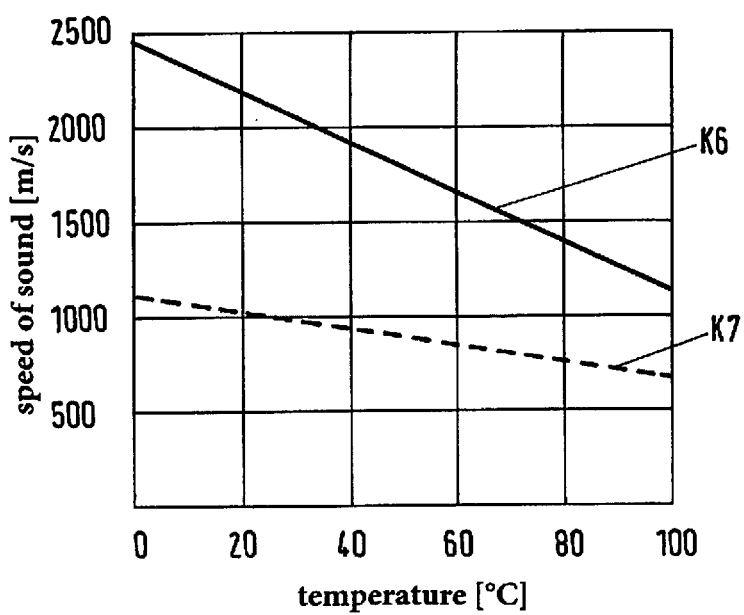
FIG. 14 is a diagram showing the speed of sound in two different materials for the pipe.

FIG. 14 illustrates an embodiment of how a pipe characteristic of the pipe 100 through which the fluid flows can be detected with the ultrasonic measuring device 1 according to the invention or with the method according to the invention. For this purpose, the transit time of the characterization signal 61-64 in the wall 101 of the pipe 100 is detected, for example, by means of the characterization signals 61 or 62 or 63 or 64. This can be used to detect the speed of sound of the material of which the preferably flexible pipe 101 is made. FIG. 14 shows with curves K6 and K7 the relationship between the speed of sound in the pipe 100 and the temperature for two different materials. The solid curve K6 shows the speed of sound for PVC and the dashed curve K7 shows the speed of sound for silicone rubber RTV-602. It can be seen that the speeds of sound in these two materials differ significantly, so that—even if the temperature is not known—the material of which the pipe 100 consists can be detected as a pipe characteristic from a determination of the speed of sound in the wall 101 of the pipe 100.

Since the ultrasonic measuring device 1 according to the invention or the method according to the invention can be used to detect not only the flow rate of the fluid through the pipe 100 but also a further parameter of the fluid, and in particular a parameter of the fluid, which is independent of the respective flow velocity of the fluid, the ultrasonic measuring device 1 according to the invention and the method according to the invention are particularly suitable for the monitoring and controlling of processes, for example in biotechnology, in the pharmaceutical industry or in the semiconductor industry, where a fluid flows through a preferably flexible pipe 100. In particular, changes in parameters and thus in the properties of the fluid, such as changes in concentration or other changes in the composition of the fluid, can be reliably detected. Therefore, the ultrasonic measuring device 1 according to the invention and the method according to the invention are particularly suitable for control loops in processes with flowing fluids. The monitoring of one or more parameters of the fluid enables the identification of deviations of this/these parameter(s) from a predeterminable set point of the respective parameter. Appropriate control measures can then be initiated to reduce the actual value of the respective parameter to the respective set point.

What is claimed:

1. An ultrasonic measuring device for the measurement of a fluid flowing in a pipe, comprising:
    a closable housing forming a clamp for a clamping connection with the pipe, the housing including a first housing part and a second housing part, the first housing part and the second housing part connected to each other by an articulated joint and forming a continuous central recess, which has a longitudinal extension defining a flow direction, the housing configured to releasably attach to the pipe with the clamp configured to tension the first and second housing parts together such that, in a closed state of the housing, the central recess receives the pipe and fixes the pipe with respect to the housing, so that the fluid is capable of flowing through the pipe in the central recess in the flow direction; and
    at least four ultrasonic transducers disposed in the housing for respective emitting and receiving of ultrasonic signals, at least two first ultrasonic transducers of the at least four ultrasonic transducers are arranged laterally on a first side of the central recess in the closed state of the housing, and at least two second ultrasonic transducers of the at least four ultrasonic transducers are arranged laterally on a second side of the central recess in the closed state of the housing, the second side opposed to the first side so that the recess is disposed between first ultrasonic transducers of the at least two first and second ultrasonic transducers and between second ultrasonic transducers of the at least two first and second ultrasonic transducers, the ultrasonic transducers arranged and aligned such that the first ultrasonic transducer of the at least two first ultrasonic transducers is configured to emit a first measuring signal to the second ultrasonic transducer of the at least two second ultrasonic transducers obliquely to the flow direction and configured to receive a second measuring signal emitted by the second ultrasonic transducer of the at least two second ultrasonic transducers obliquely to the flow direction, and the first ultrasonic transducer of the at least two first ultrasonic transducers being arranged and aligned at substantially the same longitudinal position along the flow direction as the first ultrasonic transducer of the at least two second ultrasonic transducers such that one of the first ultrasonic transducer of the at least two first ultrasonic transducers and the first ultrasonic transducer of the at least two second ultrasonic transducers is capable of receiving a measuring signal progressing perpendicular to the flow direction from the other of the first ultrasonic transducer of the at least two first ultrasonic transducers and the first ultrasonic transducer of the at least two second ultrasonic transducers.

2. The ultrasonic measuring device according to claim 1, wherein the at least four ultrasonic transducers are arranged cross-shaped in the closed state of the housing, so that one of at least two first ultrasonic transducers on the first side is opposed to one of the at least two second ultrasonic transducers on the second side.

3. The ultrasonic measuring device according to claim 1, further comprising an attenuation element disposed between the at least two first ultrasonic transducers or between the at least two second ultrasonic transducers, the attenuation element configured to suppress direct exchange of ultrasonic signals between the at least two first ultrasonic transducers and between the at least two second ultrasonic transducers.

4. The ultrasonic measuring device according to claim 1, wherein the at least four ultrasonic transducers includes six ultrasonic transducers, including the at least two first ultrasonic transducers, the at least two second ultrasonic transducers and two calibration transducers for the respective emitting and receiving of ultrasonic signals, a first calibration transducer of the calibration transducers being arranged on the first side and a second calibration transducer of the calibration transducers being arranged on the second side in the closed state of the housing, the first and second calibration transducers being opposed to each other and the first and second calibration transducers being each arranged and aligned for emitting an ultrasonic signal perpendicular to the flow direction.

5. The ultrasonic measuring device according to claim 1 further comprising a temperature sensor configured to determine a temperature of the fluid.

6. The ultrasonic measuring device according to claim 1, wherein the central recess has a substantially rectangular cross-section perpendicular to the flow direction in the closed state of the housing.

7. A method for ultrasonic measurement on a fluid flowing in a pipe, the method comprising:
    attaching a housing of an ultrasonic measuring device to the pipe such that the pipe is received by a continuous central recess, which has a longitudinal extension defining a flow direction;
    clamping the pipe with a clamp by articulating a first housing part of the housing and a second housing part of the housing relative to each other with an articulated joint, the clamp tensioning the first and second housing parts together such that the pipe is fixed with respect to the housing;
    emitting and receiving measuring signals by at least four ultrasonic transducers, the at least four ultrasonic transducers including at least two first ultrasonic transducers are arranged laterally on a first side of the central recess and at least two second ultrasonic transducers, arranged laterally on a second side of the central recess, the second side being opposed to the first side, so that the recess with the pipe is located between the at least two first ultrasonic transducers and the at least two second ultrasonic transducers;
    a first ultrasonic transducer of the at least two first ultrasonic transducers emitting a first measuring signal to one of a second ultrasonic transducers of the at least two second ultrasonic transducer obliquely to the flow direction or receiving a second measuring signal emitted by the second ultrasonic transducer of the at least two second ultrasonic transducer obliquely to the flow direction;

emitting a measuring signal by one of the first ultrasonic transducer of the at least two first ultrasonic transducers and a first ultrasonic transducer of the at least two second ultrasonic transducers so as to progress perpendicular to the flow direction and be received by the other of the first ultrasonic transducer of the at least two first ultrasonic transducers and the first ultrasonic transducer of the at least two second ultrasonic transducers;

transmitting the received measuring signal to an evaluation unit; and detecting at least one parameter, which depends on the speed of sound or sound absorption in the fluid, by the received measuring signals.

8. The method according to claim 7, wherein the detecting the at least one parameter includes detecting the at least one parameter by a transit time of the measuring signal or by a transit time difference of two measuring signals or by attenuation of the measuring signal.

9. The method according to claim 7, further comprising emitting a characterization signal from one of the at least two first ultrasonic transducers or from one of the at least two second ultrasonic transducers in a direction of the pipe and receiving the characterization signal reflected by the pipe by one of the at least two first ultrasonic transducers or by one of the at least two second ultrasonic transducers arranged on a same side as the ultrasonic transducer which emitted the characterization signal, and detecting a pipe characteristic by the received characterization signal.

10. The method according to claim 7, further comprising emitting at least one ultrasonic signal perpendicular to the flow direction by two calibration transducers, a first calibration transducer arranged on the first side and a second calibration transducer on the second side, the at least one ultrasonic signal being received by the first or the second calibration transducer, and using the received ultrasonic signal to detect a pipe characteristic or to detect the parameter.

11. The method according to claim 7, further comprising detecting a temperature of the fluid by a temperature sensor and using the temperature to detect the parameter.

12. The method according to claim 7, further comprising emitting a continuous ultrasonic signal with at least one ultrasonic transducer of the at least four ultrasonic transducers, an amplitude of the continuous ultrasonic signal being substantially constant over a predeterminable period of time.

13. The method according to claim 12, wherein the continuous ultrasonic signal is generated by a sequence of discrete pulses, and a temporal distance between two pulses of the discrete pulses is smaller than a decay time of a pulse of the discrete pulses.

14. The method according to claim 7, wherein the parameter is at least one of a flow rate of the fluid through the pipe, volume or mass fraction of a component of the fluid, concentration of a component contained in the fluid, a solids content in the fluid, cell density in the fluid, optical density of the fluid, viscosity of the fluid, physical density of the fluid, gas concentration in the fluid, change in the composition of the fluid.

* * * * *